Feb. 24, 1953 J. J. DUGGAN 2,629,448
LIQUID PROPORTIONER
Filed Dec. 20, 1950
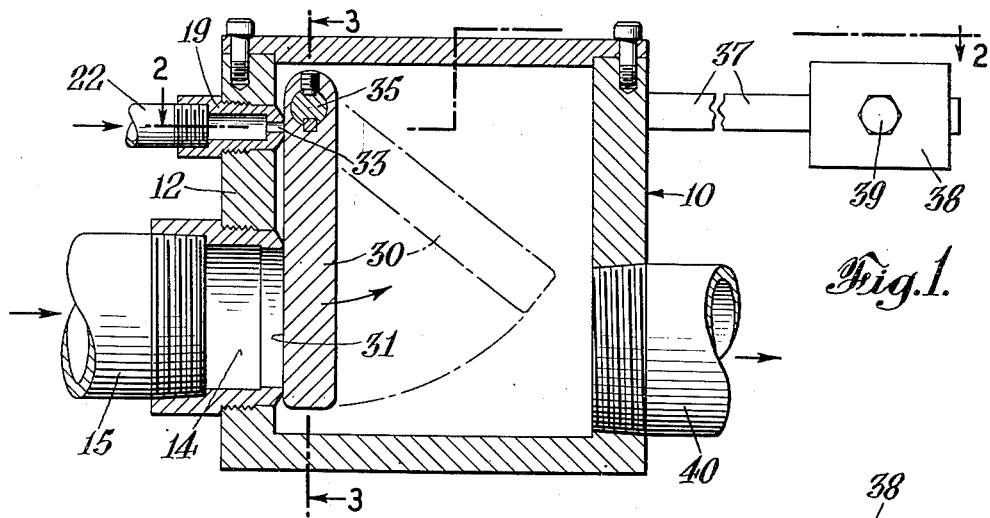
Fig.1.
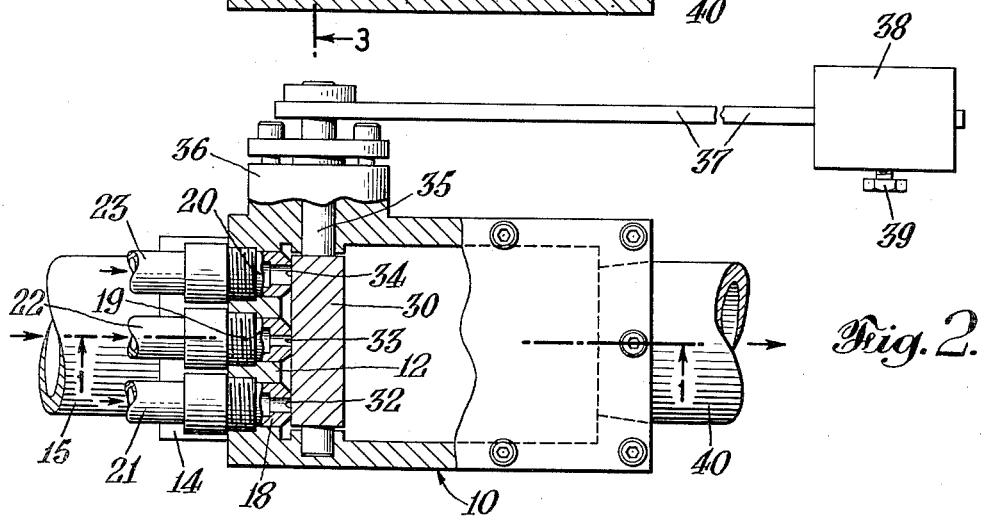
Fig.2.
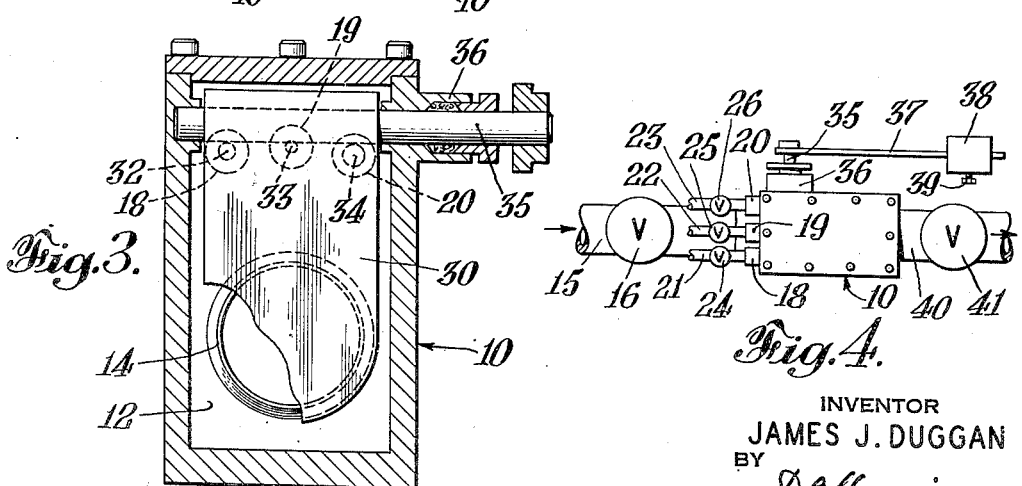
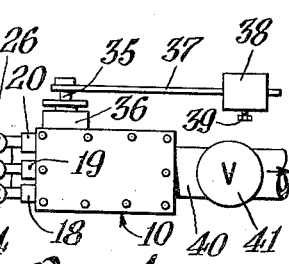
Fig.3.
Fig.4.
INVENTOR
JAMES J. DUGGAN
BY
D.C.Harrison
ATTORNEY Patented Feb. 24, 1953

2,629,448

UNITED STATES PATENT OFFICE 2,629,448

LIQUID PROPORTIONER

James Joseph Duggan, Charleston, W. Va., assignor to Union Carbide and Carbon Corporation, a corporation of New York Application December 20, 1950, Serial No. 201,354

4 Claims. (Cl. 169—14)

1

This invention relates to liquid proportioners, and more particularly to devices of this character for introducing an additive liquid to another liquid to be benefited thereby.

Objects of the invention are to proportion one or more liquids to another through fixed orifices to each of which a variable closure is attached and is controlled mechanically by the actual flow of the largest volume, regardless of pressure, temperature, or other characteristics for the purpose of mixing, blending, or compounding such liquids into one solution or compound of desired concentration.

According to the present invention, the flow of an additive liquid is proportioned to the flow of a control liquid by a nozzle to which the control liquid is supplied at predetermined hydraulic pressure, a smaller nozzle to which the additive liquid is supplied at a predetermined hydraulic pressure, a movable closure for said control liquid nozzle pivoted on an axis eccentric to its nozzle, means for exerting an opposing mechanical pressure on said closure whereby the same swings about its axis away from said nozzle in response to differential pressure, a discharge conduit for the mixed liquids having a control valve for determining the rate of flow through said discharge conduit, whereby said closure swings through an angle proportional to said rate of flow, and a closure for said additive liquid nozzle rigidly connected to said control liquid nozzle closure and pivoted about the same axis, whereby said additive liquid nozzle closure swings through the same angle proportional to said rate of flow through said mixed liquid discharge conduit.

In the drawing:

Fig. 1 is a vertical section through a liquid proportioner according to the preferred embodiment of the present invention, as taken along the line 1—1 of Fig. 2;

Fig. 2 is a horizontal section taken along the line 2—2 of Fig. 1;

Fig. 3 is a vertical section taken along the line 3—3 of Fig. 1; and

Fig. 4 is a diagram of the piping for liquid supply and discharge.

The liquid proportioner comprises a casing 10 having a flat end wall 12 provided with a nozzle 14 to which the control liquid is supplied by a pipe 15 at a predetermined hydraulic pressure which may be controlled or determined by a pressure regulator or valve 16. The wall 12 is also provided with smaller nozzles 18, 19 and 20, to which additive liquids are supplied by respective pipes 21, 22 and 23 at predetermined hydraulic pressures respectively controlled or predetermined by pressure regulators or valves 24, 25 and 26.

Pivoted in the casing 10 on an axis eccentric to the central nozzle 14 is a movable member 30. An area of the surface of the member 30 opposite to and cooperating with the nozzle 14 forms a movable closure 31 therefor. Smaller areas of the surface of the member 30 opposite to and cooperating with the smaller nozzles 18, 19 and 20 form respective movable closures 32, 33 and 34 therefor. Thus the closures for the smaller nozzles 18, 19 and 20 are rigidly connected to the closure for the control nozzle 14, and are also pivoted about the same axis.

The member 30 is keyed on a shaft 35 journaled in the casing 10, and extends out through a stuffing box 36, or may be contained within the casing 10 if no external weight 38 or lever arm 37 is required. Keyed on the projecting end of the shaft 35 is a lever arm 37 on which a sliding weight 38 is mounted, and secured in adjusted positions by a set screw 39.

The casing 10 has a discharge conduit 40 leading to a valve 41 on the downstream side of the casing 10, for determining the volume of flow of mixed liquid leaving the casing 10.

In operation, control liquid is supplied to the control nozzle 14 at a predetermined hydraulic pressure, and additive liquid is supplied to one or more of the nozzles 18, 19 and 20 at predetermined hydraulic pressure, preferably the same pressure for all. When the discharge valve 41 is opened, the hydraulic pressure in pipe 15 is exerted on the closure 31 but is opposed by the mechanical pressure determined by the weight 38, or weight of the movable member 30. The differential pressure swings the member 30 about its pivot 35 through an angle proportional to the rate of flow through the discharge conduit 40. This swinging of the member 30 swings the closures 32, 33 and 34 through the same angle proportional to the rate of flow through the discharge conduit 40.

The closure 31 for the control liquid nozzle 14 constitutes a regulating or positioning valve, and inasmuch as the discharge valve 41 controls the flow of liquid on the downstream side, position of the member 30 restricts the orifice and permits the actual flow through the discharge conduit 40 in gallons per minute to be calculated, calibrated and indicated. This restriction further enables a desired pressure drop across the regulating or positioning valve 31. By adding or reducing weight, or adjusting the position of the sliding weight 38 on the lever arm 37, the pressure drop can be increased and decreased as desired.

The closures 32, 33 and 34 for the nozzles 18, 19 and 20 constitute proportioning valves having fixed orifices sized in proportion to the desired flow. For example, the diameter of the fixed orifices in nozzles 18, 19 and 20 are one-tenth of the diameter of that of nozzle 14, which in full open position of unrestricted orifice for nozzles 14 and 18, permits the flow of the solution to be proportioned into the supply stream through nozzle 14 at a ratio of 1 to 99, or one percent of the total main supply volume. The direct connection between the closure 32 and 31 causes reduced flows to be introduced in proportion to the flow through nozzle 14 because the member 30 positions the closure 32 in direct proportion to the flow through nozzle 14. Thus when a one percent solution is desired in the main stream through nozzle 14, one of the nozzles having an area of $1/100$ of the central nozzle 14 could be used, the others being closed by the manual valve 24, 25 or 26. Obvious adjustment will produce two percent or three percent solutions as desired.

It is also true that this device, by proper sizing of the orifices 32, 33 and 34, can proportion one or more liquids into the main stream in individual or combined amounts in any proportion desired. For example, for certain chemical solutions one orifice such as 32 is used for one percent, and two orifices 32 and 34 for two percent, leaving the center orifice for liquid foam solutions which are used in either three or six percent.

The liquid proportioner herein described, can be used in connection with any standard equipment such as water supplies taken from hydrants or any pressurized source such as booster pumps on fire trucks or booster pumps on water supply, and can be installed between two lengths of standard fire hose or directly connected to fire hydrants or booster pump outlets. It is accurate when the throttling or control of the flow is on the outlet or downstream side of the proportioner. It can also be installed in any permanently piped system, the size being determined by the flow requirements.

Advantages of the invention are that the proportioner has substantially only one moving part, is self-cleaning where water supplies are contaminated with solids, is entirely reliable for automatic and instantaneous use and will function with efficiency when properly sized and the flow controlled at any point beyond the outlet of the proportioner.

I claim:

1. A device for proportioning the hydraulic flow of an additive liquid to the hydraulic flow of a control liquid, which comprises a control liquid nozzle, means for supplying the control liquid to said control liquid nozzle at a predetermined hydraulic pressure, a smaller additive liquid nozzle means for supplying the additive liquid to said smaller additive liquid nozzle at a predetermined hydraulic pressure, a movable closure for said control liquid nozzle pivoted on an axis eccentric to its nozzle, means for exerting an opposing mechanical pressure on said closure whereby the same swings about its axis away from said nozzle in response to differential pressure, a discharge conduit for the mixed liquids having a control valve for determining the rate of hydraulic flow through said discharge conduit, whereby said closure swings through an angle proportional to said rate of hydraulic flow, and a closure for said additive liquid nozzle rigidly connected to said control liquid nozzle closure and pivoted about the same axis, whereby said additive liquid nozzle closure swings through the same angle proportional to said rate of hydraulic flow through said mixed liquid discharge conduit.

2. Device as claimed in claim 1, in combination with a second additive liquid nozzle, means for supplying additive liquid to said second additive liquid nozzle at a predetermined hydraulic pressure, and a closure is provided for said second additive liquid nozzle also rigidly connected to said control liquid nozzle closure and pivoted about the same axis, whereby said second additive liquid nozzle closure swings through the same angle proportional to said rate of hydraulic flow through said mixed liquid discharge conduit.

3. Device as claimed in claim 1, in which a casing is provided having a wall, all of said nozzles are mounted in said wall, and all of said nozzle closures are carried by a unitary member keyed on a shaft journaled in said casing coaxial with said pivotal axis.

4. In a fire-fighting system, a device for proportioning the hydraulic flow of a chemical solution to the hydraulic flow of a control stream of water, which comprises a water nozzle, means for supplying the control stream of water to said water nozzle at a predetermined hydraulic pressure, a smaller chemical solution nozzle, means for supplying the chemical solution to said smaller nozzle at a predetermined hydraulic pressure, a movable closure for said control stream water nozzle pivoted on an axis eccentric to its nozzle, means for exerting an opposing mechanical pressure on said closure whereby the same swings about its axis away from said nozzle in response to the differential between said mechanical and hydraulic pressures, a discharge conduit for the mixed chemical solution and water having a hydraulic control valve for determining the rate of hydraulic flow through said discharge conduit, whereby said closure swings through an angle proportional to said rate of hydraulic flow, and a closure for said smaller chemical solution nozzle rigidly connected to said control stream water nozzle closure and pivoted about the same axis, whereby the smaller chemical solution nozzle closure swings through the same angle proportional to said rate of hydraulic flow through said mixed chemical solution and water discharge conduit.

JAMES JOSEPH DUGGAN.

REFERENCES CITED

The following references are of record in the file of this patent:

UNITED STATES PATENTS

| Number | Name | Date |
|---|---|---|
| 1,063,030 | Heidelmann | May 27, 1913 |
| 1,223,109 | Reichenbach | Apr. 17, 1917 |
| 1,773,290 | Waite | Aug. 19, 1930 |
| 2,084,489 | Hess | June 22, 1937 |